(No Model.)
A. WÖRNER.
TRAM CAR.
No. 480,310. Patented Aug. 9, 1892.
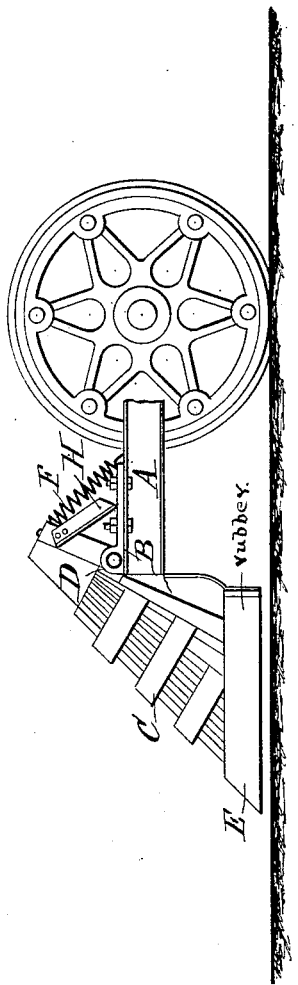
WITNESSES:
A. Schehl.
J. F. Dillon
INVENTOR
Adolf Wörner
BY
Geo. H. Benjamin
ATTORNEY.
THE NORRIS PETERS CO., PHOTO-LITHO., WASHINGTON, D. C.

United States Patent Office.

ADOLF WÖRNER, OF BUDA-PESTH, AUSTRIA-HUNGARY, ASSIGNOR TO SIEMENS & HALSKE, OF BERLIN, GERMANY.

TRAM-CAR.

SPECIFICATION forming part of Letters Patent No. 480,310, dated August 9, 1892.

Application filed February 8, 1892. Serial No. 420,794. (No model.)

*To all whom it may concern:*

Be it known that I, ADOLF WÖRNER, a subject of the Emperor of Germany, residing at Buda-Pesth, Austria-Hungary, have invented new and useful Improvements in Tram-Cars, of which the following is a specification.

My invention relates to a device adapted to be applied to the ends of a tram-car, the trucks thereof, or other moving vehicle, and which has for its object to prevent accidents to or mitigate the severity of a blow inflicted upon persons or animals struck by the car or vehicle when moving.

In the accompanying drawings, which illustrate my invention, similar letter of reference indicate like parts.

Figure 1 is an elevation of a portion of a tram-car, showing my improved device attached to one end thereof. Fig. 2 is a bottom view of the device and a portion of the car to which it is attached.

In the drawings, A A are two beams of the car or truck, which project slightly in front of the wheels. Upon these beams are mounted, in any suitable manner two bearings B for the safety device or cow-catcher C, which is supported in the bearings by means of the pivots D. The safety device C may be given any desired form, preferably that shown in the drawings. Along the front of the bottom of the safety device, and carried under its lower edge, is a thick band of rubber E. The normal position of the safety device C is such that its lower edge does not come in contact with the rails or ground over which the car or vehicle is moving, and it is maintained in this position by means of the helical springs F F, one end of each of which is connected to the top of the safety device and the other end to the arms G G, which are attached to the frames A A.

H H are stops connected to the safety device which prevent its being drawn upward by the springs F F beyond a certain point.

The operation of my device is as follows: When a person, animal, or other body is struck by the moving vehicle, the force of the impact plus the weight of the body struck causes the end of the safety device to be moved downward, thereby preventing the body from being forced under it, and so under the wheels of the vehicle. As the safety device is forced downward its lower edge will be brought in contact with the rails or ground over which the body is moving and so tend to retard the motion of the vehicle.

It will be obvious that the device which I have described may be applied either to the frame of the vehicle or to the frame of the trucks supporting the vehicle, when the tram-car is provided with trucks, and at both ends of the vehicle.

Having thus described my invention, I claim—

1. The combination, with a tram-car or with the trucks thereof, of a safety device pivoted on the ends of said car or trucks, a spring connected at one end with the safety device above its pivotal point and at its other end with the car body or trucks for normally holding the said safety device above the level of the ground, and a stop for limiting the upward motion of the safety device connected thereto above its pivotal point.

2. The combination, with a tram-car or with the trucks thereof, of a safety device pivoted on the ends of said car or trucks, a rubber covering carried over the lower edge of said safety device, and a retractile spring connected to said safety device above its pivotal point, substantially as described.

3. The combination, with a tram-car or with the trucks thereof, of a safety device pivoted on the ends of said car or trucks, a retractile spring connected to said safety device above its pivotal point, a device for limiting the upward motion of the safety device connected thereto above its pivotal point, and an elastic covering for the lower edge of the safety device.

In testimony whereof I have, this 20th day of November, 1891, signed my name to this specification in the presence of two subscribing witnesses.

ADOLF WÖRNER.

Witnesses:
GEORGE H. BENJAMIN,
T. F. DILLON.